US008681091B2

(12) United States Patent
Lai et al.

(10) Patent No.: US 8,681,091 B2
(45) Date of Patent: Mar. 25, 2014

(54) BISTABLE DISPLAY DEVICE

(75) Inventors: Rui-Yang Lai, Hsinchu (TW); Feng-Chuan Yeh, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 85 days.

(21) Appl. No.: 13/050,082

(22) Filed: Mar. 17, 2011

(65) Prior Publication Data

US 2011/0227869 A1    Sep. 22, 2011

(30) Foreign Application Priority Data

Mar. 19, 2010    (TW) .............................. 99108251 A

(51) Int. Cl.
*G09G 3/34*    (2006.01)

(52) U.S. Cl.
USPC ...... 345/107; 345/173; 178/18.01; 178/19.01

(58) Field of Classification Search
USPC ............. 345/107, 173–178; 178/18.01–19.07
See application file for complete search history.

(56) References Cited

U.S. PATENT DOCUMENTS

| 7,161,590 | B2 * | 1/2007 | Daniels | ......................... 345/204 |
| 7,394,509 | B2 | 7/2008 | Sage | |
| 2006/0044482 | A1 | 3/2006 | Shaftel | |
| 2008/0024427 | A1 * | 1/2008 | Kuo et al. | ..................... 345/107 |
| 2009/0160790 | A1 * | 6/2009 | Fukushima et al. | .......... 345/173 |
| 2011/0012841 | A1 * | 1/2011 | Lin | ............................... 345/173 |

FOREIGN PATENT DOCUMENTS

| CN | 1734338 | 2/2006 |
| CN | 101329607 A | 12/2008 |
| CN | 101634915 | 1/2010 |
| TW | 200627373 | 8/2006 |
| TW | 200825878 | 6/2008 |
| TW | M334788 | 6/2008 |

OTHER PUBLICATIONS

Chinese Patent Office issued Office Action Dec. 17, 2012.
Taiwan Intellectual Property Office, "Office Action", Apr. 22, 2013, Taiwan.
State Intellectual Property Office of the People's Republic of China, "Office Action", Jul. 22, 2013, China.

* cited by examiner

*Primary Examiner* — Michael Pervan
(74) *Attorney, Agent, or Firm* — WPAT, PC; Justin King

(57) ABSTRACT

A bistable display device comprises a substrate, a display film, a display circuit, an electromagnetic sensing layer, a shielding layer and a protection layer. The substrate has an upper surface and a lower surface. The display film is disposed on the upper surface of the substrate. The display circuit is formed on the upper surface of the substrate. The electromagnetic sensing layer is formed on the lower surface of the substrate. The shielding layer is disposed under the electromagnetic sensing layer. The protecting layer is disposed under the shielding layer.

14 Claims, 3 Drawing Sheets

BISTABLE DISPLAY DEVICE

BACKGROUND

1. Technical Field

The present invention relates to display devices and, particularly to a bistable display device with electromagnetic touch function.

2. Description of the Related Art

With the development of the science and technology, more and more consumers would carry portable electronic devices with display function. For operating conveniently in use, most of the portable electronic devices can be controlled in a touch mode. Currently, the touch mode applied widely into the electronic devices may be divided into a capacitive touch and a resistive touch. However, they both need to dispose a capacitive or resistive sensing module on a display module. If the capacitive touch or the resistive touch is applied to an electronic device having a backlight source, it would achieve an excellent effect. However, if the capacitive touch or the resistive touch is applied to a reflective-type bistable display device, the sensing module disposed on the display module will reduce the reflectivity and thus images displayed on the electronic device are poor.

For solving the problem, some manufacturers have proposed an electromagnetic touch method. The electromagnetic touch method disposes an electromagnetic sensing module under the display module and employs an electromagnetic stylus to cause an electromagnetic change of the sensing module under the display module for recognizing the touch operation. The display module and the electromagnetic sensing module usually are manufactured by different manufacturers respectively. That is, a separate design is employed for the display module and the electromagnetic sensing module, and thus it needs to assemble the electromagnetic sensing module and the display module together by laminating or other modes when assembling. However, since the assembling process is performed by assemblers, it often causes some problems such as non-excellent touch sensing result or improper assembling and so on resulting from the mistaken operation of the assemblers when assembling the electromagnetic sensing module and the display module together.

BRIEF SUMMARY

The present invention relates to a bistable display device, which can improve the flexibility and thinness of the bistable display device and reduce the human error in assembling so as to reduce the assembling process and cost.

A bistable display device in accordance with an exemplary embodiment of the present invention comprises a substrate, a display film, a display circuit, an electromagnetic sensing layer, a shielding layer and a protection layer. The substrate has an upper surface and a lower surface. The display film is disposed on the upper surface of the substrate. The display circuit is formed on the upper surface of the substrate. The electromagnetic sensing layer is formed on the lower surface of the substrate. The shielding layer is disposed under the electromagnetic sensing layer. The protecting layer is disposed under the shielding layer.

In an exemplary embodiment of the present invention, the electromagnetic sensing layer operatively has a magnetic field, and generates a magnetic field changing signal when the magnetic field changes.

In an exemplary embodiment of the present invention, the display film is an image-displaying interface, and is operatively to change the magnetic field by user.

The present invention forms the display circuit and the electromagnetic sensing layer directly on the upper surface and the lower surface of the substrate respectively, thus it can improve the flexibility and thinness of the bistable display device and reduce the human error in assembling associated with the prior art so as to reduce the assembling process and cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Accordingly, the descriptions will be regarded as illustrative in nature and not as restrictive.

Figure 1:
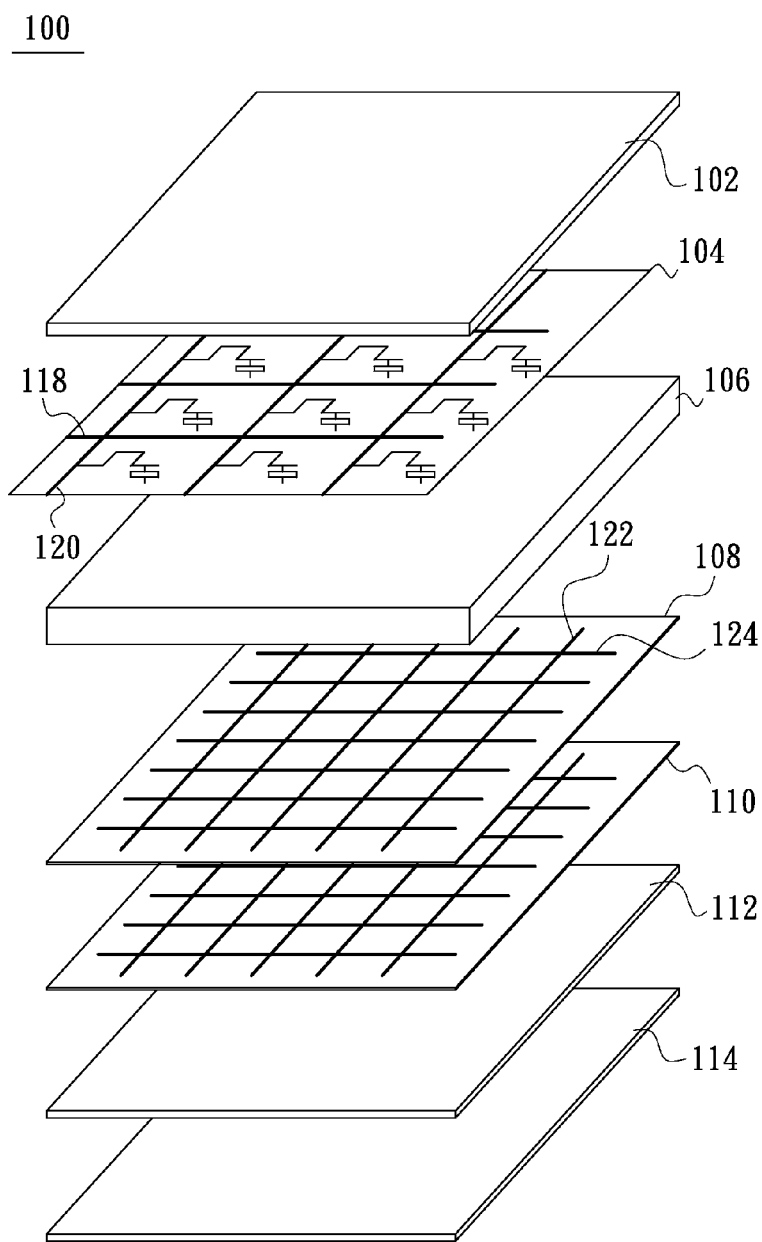
FIG. 1 is a schematic perspective exploded view of a bistable display device in accordance with an exemplary embodiment of the present invention.

Refer to FIG. 1, which is a schematic perspective exploded view of a bistable display device in accordance with an exemplary embodiment of the present invention. The bistable display device 100 comprises a display film 102, a display circuit 104, a substrate 106, a first electromagnetic sensing layer 108, a second electromagnetic sensing layer 110, a shielding layer 112 and a protection layer 114.

The display film 102 may be composed of two transparent plates (not shown) and a display material injected between the two transparent plates or coated on the transparent plates for displaying. The display material may be electronic ink or cholesterol liquid crystal (ChLC). However, the present invention is not limited in these.

The display circuit 104 is disposed under the display film 102 and configured (i.e., structured and arranged) for inputting display data. The display circuit 104 may be composed of a plurality of scan lines 118 and a plurality of data lines 120. The scan lines 118 are arranged perpendicularly crossing the data lines 120 without contact.

The substrate 106 has an upper surface and a lower surface. The display circuit 104 is directly formed on the upper surface of the substrate 106. It is understood for persons skilled in the art that, the formation of the display circuit 104 on the upper surface of the substrate 106 can be carried out by a panel process.

In a preferred exemplary embodiment, the substrate 106 may be a glass substrate, a metal foil or a plastic substrate. Moreover, the substrate 106 may be a rigid substrate or a flexible substrate. However, the present invention is not limited in these.

The first electromagnetic sensing layer 108 is directly formed on the lower surface of the substrate 106, and the formation of the first electromagnetic sensing layer 108 may be carried out by a panel process. The first electromagnetic sensing layer 108 is composed of a plurality of longitudinal sensing nets 122 and a plurality of transversal sensing nets 124, and the longitudinal sensing nets 122 are intersected with the transversal sensing nets 124 without contact.

The second electromagnetic sensing layer 110 is formed under the first electromagnetic sensing layer 108, and the formation of the second electromagnetic sensing layer 110 may be carried out by a semiconductor process. The second electromagnetic sensing layer 110 is similar with the first electromagnetic sensing layer 108, and is composed of a plurality of longitudinal sensing nets and a plurality of transversal sensing nets intersected with the longitudinal sensing nets without contact.

The preferred exemplary embodiment of the present invention employs two electromagnetic sensing layers 108 and 110 as an example to describe the present invention. However, the amount of the electromagnetic sensing layers may be decided by the actual needs in design, such as one or three instead. But the present invention is not limited in these.

The shielding layer 112 is disposed under the second electromagnetic sensing layer 110 to shield the first electromagnetic sensing layer 108, the second electromagnetic sensing layer 110, the substrate 106, the display circuit 104 and the display film 102. The shielding layer 112 is configured for shielding the first electromagnetic sensing layer 108 and the second electromagnetic sensing layer 110 from a control circuit board (i.e., a circuit board having a control circuit) or a system circuit board (which will be described in the following with reference to FIG. 3), and is made of a metallic material. The protection layer 114 is disposed under the shielding layer 112. The protection layer 114 is configured for avoiding the shielding layer 112 from contacted with other elements or wires of the bistable display device 100, so as to prevent the occurrence of short-circuit. It is understood for persons skilled in the art that the protection layer 114 is made of an insulating material.

Figure 2:
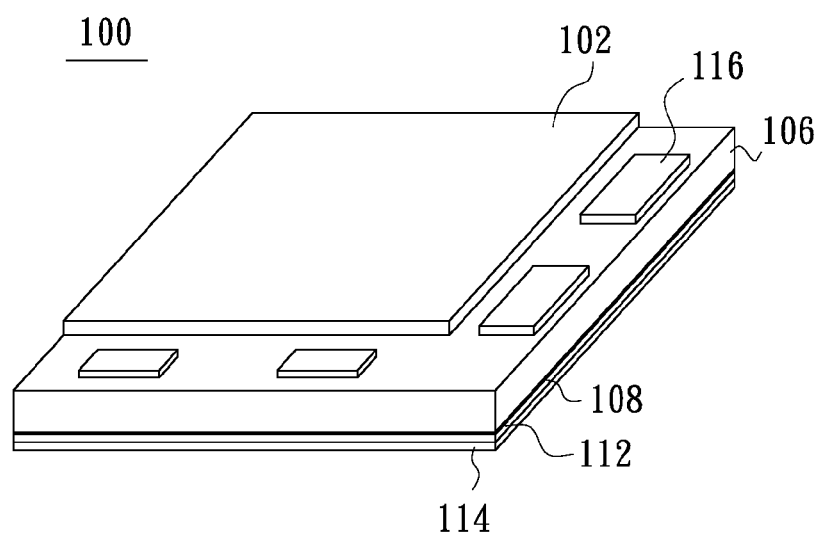
FIG. 2 is a perspective structural view of a bistable display device in accordance with an exemplary embodiment of the present invention.

Then refer to FIG. 2, which is a perspective structural view of a bistable display device in accordance with an exemplary embodiment of the present invention. In FIG. 2, the display film 102 is disposed on a part of the substrate 106, and some driving elements 116 are disposed on other part of the substrate 106 which does not dispose the display film 102. The driving elements 116 are configured for driving the scan lines 118 and the data lines 120 (as shown in FIG. 1) of the display circuit 104 (which is covered by the display film in FIG. 2) formed on the substrate 106.

In FIG. 2, the first electromagnetic sensing layer 108 is formed on the lower surface of the substrate 106 (herein, one electromagnetic sensing layer is employed as an example for the purpose of illustration). The shielding layer 112 and the protection layer 114 are sequentially disposed under the first electromagnetic sensing layer 108 in that order.

Figure 3:
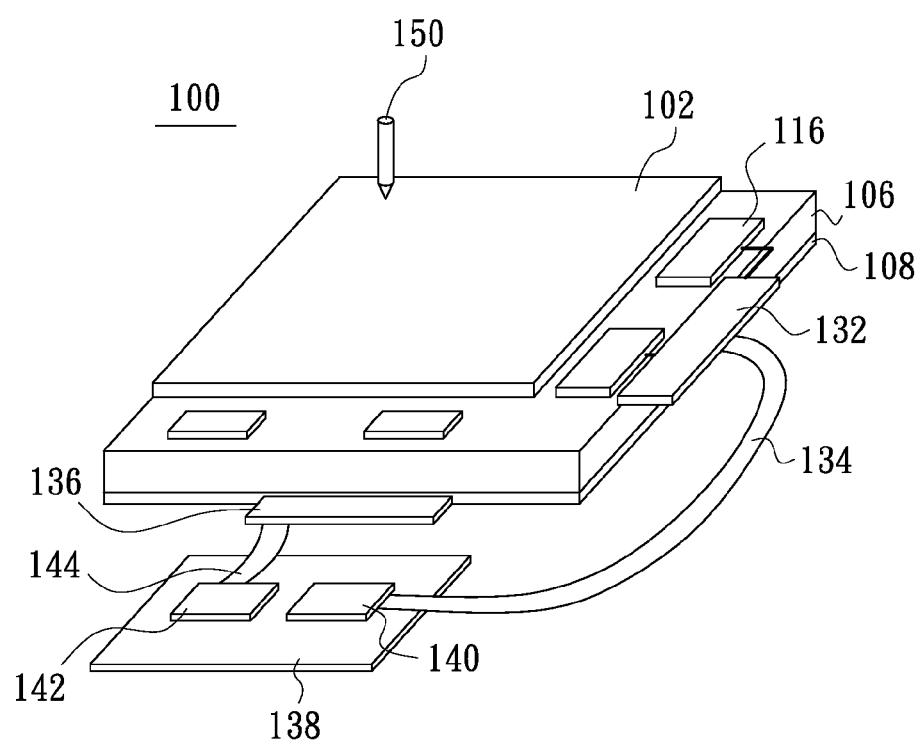
FIG. 3 is a perspective structural view of a bistable display device in accordance with another exemplary embodiment of the present invention.

Refer to FIG. 3, which is a perspective structural view of a bistable display device in accordance with another exemplary embodiment of the present invention. In the exemplary embodiment, the bistable display device 100 comprises the display film 102, the display circuit 104, the substrate 106, the first electromagnetic sensing layer 108 (for the convenience of description, only the electromagnetic sensing layer 108 herein is taken as an example for the purpose of illustration), the driving elements 116, flexible flat cable (FFC) interfaces 132 and 136, flexible flat cables 134 and 144, a circuit board 138, a display control circuit 140 and an electromagnetic control circuit 142. The users can employ an electromagnetic touch stylus 150 to perform a touch operation on the display film 102 and input data.

In the exemplary embodiment, the circuit board 138 has the display control circuit 140 and the electromagnetic control circuit 142 disposed thereon. The display control circuit 140 employs the flexible flat cable 134 to couple to the flexible flat cable interface 132 of the substrate 106, and the flexible flat cable interface 132 is coupled to the driving elements 116. Therefore, display control signals generated and outputted from the display control circuit 140 are transmitted to the driving elements 116 through the flexible flat cable 134 and the flexible flat cable interface 132.

The electromagnetic control circuit 142 employs the flexible flat cable 144 to couple to the flexible flat cable interface 136 of the first electromagnetic sensing layer 108, and the flexible flat cable interface 136 is coupled to the first electromagnetic sensing layer 108. Therefore, the electromagnetic control circuit 142 can detect the change of the magnetic field generated by the first electromagnetic sensing layer 108 and perform the coordinate computing.

The first electromagnetic sensing layer 108 generates a magnetic field after the bistable display device 100 is enabled. When the users employ the electromagnetic touch stylus 150 to operate on the display film 102, a signal sent from the electromagnetic touch stylus 150 will change the magnetic field of the first electromagnetic sensing layer 108. When the magnetic field changes, the electromagnetic control circuit 142 of the bistable display device 100 can detect a magnetic changing signal. Then, the electromagnetic control circuit 142 can calculate a coordinate(s) of the touch position according to the magnetic changing signal and perform a corresponding processing according to the positional coordinate.

In summary, the bistable display device of the present invention forms the display circuit directly on the upper surface of the substrate and forms the electromagnetic sensing layer directly on the lower surface of the substrate. Therefore, the present invention not only improves the flexibility and thinness of the bistable display device, but also reduces the human error in assembling associated with the prior art so as to reduce the assembling process and cost.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:
1. A bistable display device comprising:
a substrate having an upper surface and a lower surface;
a display film disposed on the upper surface of the substrate;

a display circuit formed between the upper surface of the substrate and the display film;
an electromagnetic sensing layer formed on the lower surface of the substrate, the electromagnetic sensing layer comprising:
a first electromagnetic sensing layer, wherein the first electromagnetic sensing layer comprising a plurality of longitudinal sensing nets and a plurality of transversal sensing nets intersected with the plurality of longitudinal sensing nets without contact; and
a second electromagnetic sensing layer disposed under the first electromagnetic sensing layer, wherein the second electromagnetic sensing layer comprising a plurality of longitudinal sensing nets and a plurality of transversal sensing nets intersected with the plurality of longitudinal sensing nets without contact;
a shielding layer disposed under the second electromagnetic sensing layer and at a side of the second electromagnetic sensing layer facing away from the display film and the display circuit, wherein the shielding layer is made of metallic material and configured for shielding the first electromagnetic sensing layer and the second electromagnetic sensing layer from a circuit board with a control circuit or a system circuit board separated from the substrate; and
a protection layer disposed under the shielding layer.

2. The bistable display device as claimed in claim 1, wherein the electromagnetic sensing layer operatively has a magnetic field and generates a magnetic field changing signal when the magnetic field changes.

3. The bistable display device as claimed in claim 2, wherein the display film is operatively to change the magnetic field by user.

4. The bistable display device as claimed in claim 1, wherein the electromagnetic sensing layer is comprised of a plurality of sensing nets arranged crossing with each other.

5. The bistable display device as claimed in claim 1, wherein the protection layer is made of an insulating material.

6. The bistable display device as claimed in claim 1, wherein the substrate is selected from a group consisting of a glass substrate, a metal foil and a plastic substrate.

7. The bistable display device as claimed in claim 1, wherein the substrate is a rigid substrate.

8. The bistable display device as claimed in claim 1, wherein the substrate is a flexible substrate.

9. The bistable display device as claimed in claim 1, wherein the first electromagnetic sensing layer is equipped with a flexible flat cable interface, the control circuit comprises an electromagnetic control circuit disposed on the circuit board, the electromagnetic control circuit employs a flexible flat cable to couple to the flexible flat cable interface of the first electromagnetic sensing layer.

10. The bistable display device as claimed in claim 9, wherein the substrate is equipped with a flexible flat cable interface, the control circuit further comprises a display control circuit disposed on the circuit board, the display control circuit employs a flexible flat cable to couple to the flexible flat cable interface of the substrate.

11. A bistable display device comprising:
a display film, a display circuit, a substrate, a first electromagnetic sensing layer, a second electromagnet layer and a shielding layer sequentially arranged in that order, the shielding layer being made of metallic material;
wherein the display circuit and the first electromagnetic sensing layer respectively directly formed at opposite surfaces of the substrate to thereby share the substrate;
wherein the first electromagnetic sensing layer comprises a plurality of longitudinal sensing nets and a plurality of transversal sensing nets crossing over with the plurality of longitudinal sensing nets;
wherein the second electromagnetic sensing layer comprises a plurality of longitudinal sensing nets and a plurality of transversal sensing nets crossing over with the plurality of longitudinal sensing nets;
wherein the shielding layer is disposed at a side of the second electromagnetic sensing layer facing away from the display film and the display circuit and configured for shielding the first electromagnetic sensing layer and the second electromagnetic sensing layer from a circuit board with a control circuit or a system circuit board separated from the substrate.

12. The bistable display device as claimed in claim 11, further comprising a protection layer disposed spaced from the first electromagnetic sensing layer and the second electromagnetic sensing layer by the shielding layer.

13. The bistable display device as claimed in claim 11, wherein the first electromagnetic sensing layer is equipped with a flexible flat cable interface, the control circuit comprises an electromagnetic control circuit disposed on the circuit board, the electromagnetic control circuit employs a flexible flat cable to couple to the flexible flat cable interface of the first electromagnetic sensing layer.

14. The bistable display device as claimed in claim 13, wherein the substrate is equipped with a flexible flat cable interface, the control circuit further comprises a display control circuit disposed on the circuit board, the display control circuit employs a flexible flat cable to couple to the flexible flat cable interface of the substrate.

* * * * *